US008015913B2

(12) United States Patent
Kriegsmann

(10) Patent No.: US 8,015,913 B2
(45) Date of Patent: Sep. 13, 2011

(54) PNEUMATIC CYLINDER FOR PRECISION SERVO TYPE APPLICATIONS

(75) Inventor: Michael K. Kriegsmann, Chicago, IL (US)

(73) Assignee: Sunstream Scientific, Inc., Chicago, IL (US)

( * ) Notice: Subject to any disclaimer, the term of this patent is extended or adjusted under 35 U.S.C. 154(b) by 636 days.

(21) Appl. No.: 12/181,114

(22) Filed: Jul. 28, 2008

(65) Prior Publication Data

US 2009/0007770 A1 Jan. 8, 2009

Related U.S. Application Data

(63) Continuation-in-part of application No. 11/078,863, filed on Mar. 10, 2005, now Pat. No. 7,404,353.

(60) Provisional application No. 60/551,379, filed on Mar. 10, 2004.

(51) Int. Cl.
*F16J 15/18* (2006.01)
*F01B 31/12* (2006.01)

(52) U.S. Cl. .......................................... 92/163; 92/5 R

(58) Field of Classification Search .................... 92/5 R, 92/163, 169.1
See application file for complete search history.

(56) References Cited

U.S. PATENT DOCUMENTS 1,206,966 A 12/1916 Wilkins
2,089,202 A 8/1937 Gartin
2,146,213 A 2/1939 Horton
2,147,150 A 2/1939 Conklin
2,761,425 A 9/1956 Bertsch
2,977,764 A 4/1961 Matthews
3,783,590 A 1/1974 Allen
3,820,446 A 6/1974 Granbom
4,406,215 A 9/1983 Lacasse
4,735,047 A 4/1988 Wiedmann
4,798,128 A 1/1989 Mita
4,825,746 A 5/1989 Herner
(Continued)

FOREIGN PATENT DOCUMENTS

WO WO03106846 12/2003

OTHER PUBLICATIONS

International Preliminary Report on Patentability issued on Feb. 1, 2011, corresponding to Intl. Appln. No. PCT/US2009/051956.

*Primary Examiner* — Michael Leslie
(74) *Attorney, Agent, or Firm* — Quarles & Brady LLP

(57) ABSTRACT

A pneumatic cylinder designed to convert compressed air into mechanical output is disclosed. The pneumatic cylinder includes a piston and rod assembly with supporting components coaxially disposed and arranged to achieve a linear mechanical force in accordance with a differential pressure across the piston. A cylindrical sleeve, secured to end caps on both openings, encircles the piston and rod assembly and helps guide the piston during travel. A conductive coil is coupled to the cylindrical sleeve to provide sensing of a position of the piston. Additionally, a manifold, which serves as a conduit for airflow between each individual cylinder volume and an external air control device, is disposed such that the cylindrical sleeve and end caps are nested, in a concentric manner, within the manifold. A manifold divider assembly is disposed such that a plurality of end channels are isolated from each other. This arrangement results in a dynamic relationship between airflow and differential pressure that is conducive to precision force and motion control.

19 Claims, 18 Drawing Sheets

SECTION C-C

DETAIL C

U.S. PATENT DOCUMENTS

| | | | | |
|---|---|---|---|---|
| 5,540,136 | A | 7/1996 | Noord | |
| 5,587,536 | A | 12/1996 | Rasmussen | |
| 6,044,752 | A | 4/2000 | Harigaya | |
| 6,186,484 | B1 | 2/2001 | Noda | |
| 6,523,523 | B2 | 2/2003 | McCoy | |
| 6,553,892 | B1 | 4/2003 | Kaneko | |
| 6,694,865 | B2 | 2/2004 | Kaneko | |
| 7,404,353 | B2 * | 7/2008 | Kriegsmann | 92/163 |

* cited by examiner

SECTION C-C

SECTION T-T

DETAIL C

DETAIL P

PNEUMATIC CYLINDER FOR PRECISION SERVO TYPE APPLICATIONS

RELATED APPLICATIONS

This application is a continuation-in-part of prior application Ser. No. 11/078,863, filed Mar. 10, 2005 entitled "Pneumatic Cylinder for Precision Servo Type Applications", which claims the benefit of U.S. Provisional Application No. 60/551,379, filed Mar. 10, 2004 entitled "Pneumatic Cylinder for Precision Servo Type Applications" which are incorporated herein by reference.

FIELD

The present disclosure relates to pneumatic cylinders and, more particularly, to pneumatic cylinders with a conductive coil and/or a manifold divider.

BACKGROUND

Conventional pneumatic cylinders provide a conduit for airflow into and out of the head and rod end volumes by means of ports machined into the respective head and rod end caps. Said ports serve as anchor points for plumbing that then communicates airflow to a control valve network. While such an arrangement has a certain level of operability, it typically creates a poor dynamic relationship between desired airflow and differential pressure. Consequently, attempts to apply such devices in precision applications have met with limited success.

Servo actuators with a continuously variable position output including a means to measure the position output. In the instance of a pneumatic servo cylinder, a sensor may be employed to measure the relative position between the moving element, for example a rod/piston assembly, and the frame to which a cylinder body is mounted. Conventionally, a hollow cylinder rod is employed so that position sensors, may be disposed within the cylinder, and partially nested within the cylinder rod. While this arrangement results in a pneumatic servo cylinder which is clean in appearance, and compact in size, hollow cylinder rods are more costly, and less structurally sound than their solid counterparts. Therefore, any position sensing means which may be integrated with the cylinder, while allowing for a solid cylinder rod, will have clear benefits.

To improve the dynamic relationship between desired airflow and differential pressure across the cylinder piston, the flow path from the control valve to the cylinder piston should be made as short and geometrically uniform as possible. Also, there is a need to improve manufacturing efficiencies in the production of the pneumatic servo cylinder while providing fewer flow path restrictions.

SUMMARY

The pneumatic cylinder disclosed herein provides a unique way to communicate airflow between a control valve and the working volumes of the pneumatic cylinder. By nesting the fundamental components of a pneumatic cylinder (e.g., the head and rod end caps, the cylindrical piston sleeve, and the piston/rod assembly) within a manifold, conduits for airflow communication are created in channels formed by the outer diameter of the cylindrical piston sleeve and the internal geometries of the manifold. Furthermore, by providing an electrically conductive coil around the cylindrical piston sleeve, the position of the piston can be determined.

In one embodiment, the manifold includes a manifold case with a manifold divider nested within the manifold case to provide airflow channels. The geometry of the airflow channels is such that the cross-sectional area of the channels is approximately equal to the cross-sectional area of the piston sleeve. These arrangements optimize the dynamic relationship between desired airflow and differential pressure.

A manifold case, fitted between the head and rod caps, and enveloping the cylinder tube in which the cylinder piston is guided. In one embodiment, the manifold case is of one-piece construction, providing a mounting surface for the valve while maintaining close alignment between the head and rod caps. The annular cavity created between manifold case and the cylinder tube is the basis for the airflow path from control valve to cylinder piston.

A manifold divider disposed in the annular cavity between manifold case and cylinder tube divides the annular cavity into separate airflow paths. This manifold divider may be secured to either the manifold case or the cylinder tube. This general arrangement of manifold case and manifold divider allows for manufacturing efficiencies in the production of the manifold case, and the flow paths from valve to corresponding annular cavity with fewer restrictions than previous arrangements. As a result, the pneumatic cylinder disclosed herein is particularly suitable for applications requiring precision control of force and motion.

DETAILED DESCRIPTION OF EXEMPLARY EMBODIMENTS

Figure 1:
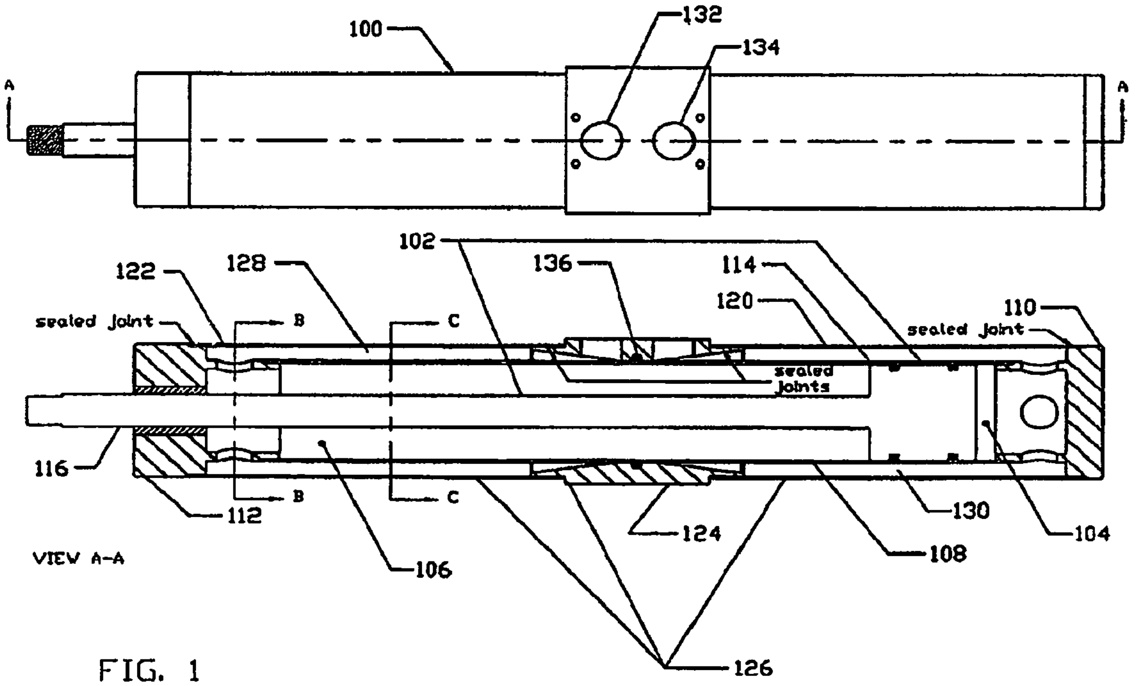
FIG. 1 illustrates a view of an example pneumatic cylinder that displays the cylinder head and rod end working ports and a cross section of the cylinder taken along lines A-A.

A pneumatic cylinder 100 designed to convert compressed air into mechanical output is illustrated in FIG. 1. Differential pressure across a piston/rod assembly 102 produces a force that can extend the piston/rod assembly 102, or cause the piston/rod assembly 102 to retract. The differential pressure is the difference in air pressure between the head end working volume 104 and the rod end working volume 106. The head end working volume 104 is the cylindrical chamber created by the piston/rod assembly 102, the piston sleeve 108, and the head end cap 110. The rod end working volume 106 is the cylindrical chamber created by the piston/rod assembly 102, the piston sleeve 108, and rod end cap 112. The piston sleeve 108 also serves to guide the piston 114 of the piston/rod assembly 102. It should be noted that the air pressure in each chamber is not uniform, and that variations over space for any specific point in time is to be expected. In addition, although cylindrical shapes are discussed in the exemplary embodiment herein, it will be readily recognized that any suitable shape(s) may be used.

Air pressure in each working volume 104 and 106 can be altered in any suitable manner. For example, the mass of air contained within a working volume 104 and/or 106 can be changed by allowing air to flow into or out of the working volume 104 and/or 106. During an extension of the rod 116, air flows into the head end working volume 104, thus increasing pressure in the head end working volume 104. Also during an extension of the rod, air flows out of the rod end working volume 106, thus decreasing pressure in the rod end working volume 106. Preferably, a pneumatic control valve 118 is used to control the communication of airflow into and out of the working volumes 104 and 106. The pneumatic control valve 118 is capable of directing compressed air into one of the working volumes 104 or 106, and conversely, discharging compressed air out of the other working volume 106 or 104 (e.g., to atmosphere).

A head end sleeve 120 and a rod end sleeve 122 are secured to a manifold coupler 124. For example, the head end sleeve 120 and the rod end sleeve 122 may each be a cylindrical tube that is secured to the manifold coupler 124 by brazing. However, any suitable process that produces an airtight seal to create a manifold 126 may be used. Preferably, the manifold 126 is assembled coaxially about the piston sleeve 108, such that the piston sleeve 108 is encircled by, or nested within, the manifold 126. The free end of the head end sleeve 120 is secured to the head end cap 110, and the free end of the rod end sleeve 122 is secured to the rod end cap 112. Any suitable method of securing the sleeves 120 and 122 to the caps 110 and 112 that produces an airtight seal may be used (e.g., brazing). Any suitable method of producing the manifold 126 and/or the sleeves 120 and 122 may be used (e.g., extrusion).

This arrangement creates a rod end channel 128 and a head end channel 130. The rod end channel 128 is an annular conduit for airflow between the rod end working volume 106 and a rod end port 132. The head end channel 130 is an annular conduit for airflow between the head end working volume 104 and a head end port 134. An O-ring 136, or other suitable seal, contained within an inner dimension groove on the manifold coupler 124, isolates the end channels 128 and 130 from each other. Damping film 138 preferably lines the cylindrical features that define the rod end channel 128 and the head end channel 130. Specifically, the outer diameter of the piston sleeve 108, the inner diameter of the rod end sleeve 122, and the inner diameter of the head end sleeve 120 may be lined with any suitable material that absorbs noises. The damping film 138 reduces noise emanated from the pneumatic cylinder 100 to the surrounding space.

Figure 2:
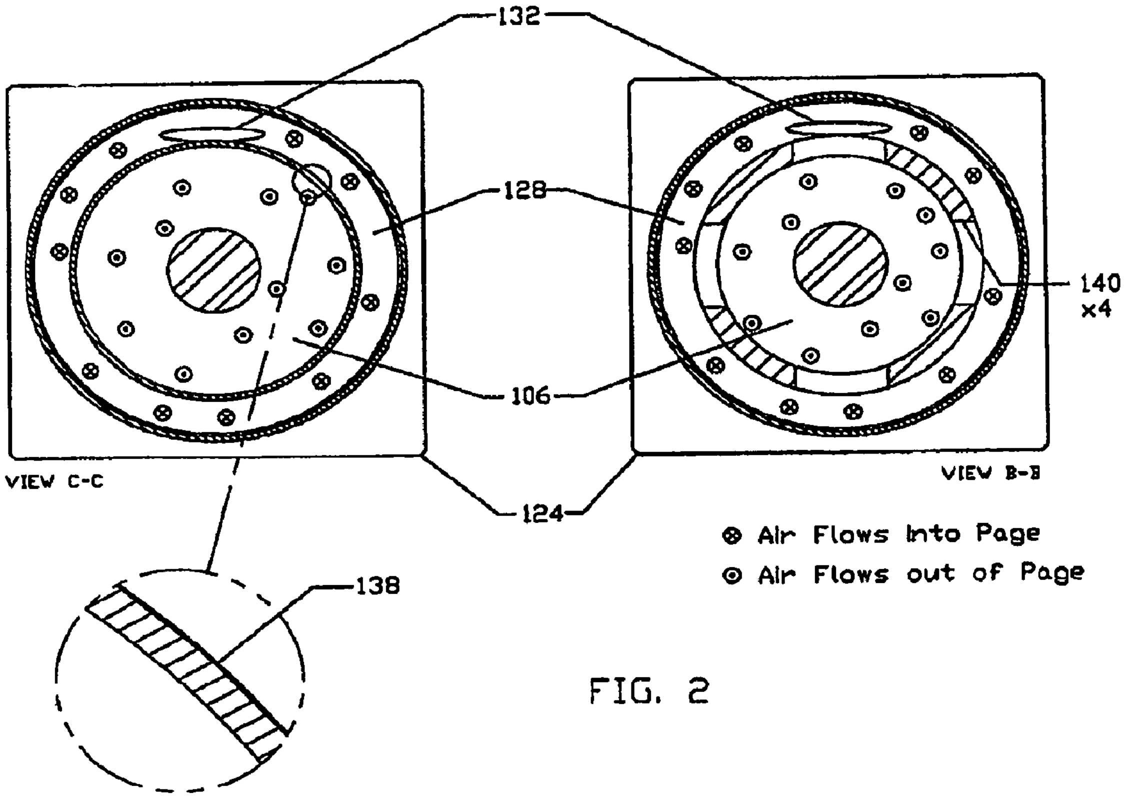
FIG. 2 illustrates a cross section of the example cylinder taken along lines B-B, a cross section of the example cylinder taken along lines and along lines C-C, and a blowup of view C-C illustrates a lining on the piston sleeve to silence noise.

Airflow is exchanged between the end channels 128 and 130 and the working volumes 106 and 104 by means of holes, slots, or like features machined into the respective head end cap 110 and/or rod end cap 112. Referring to FIG. 2, view B-B, the arrows show how air mass flows from the rod end working volume 106 into the rod end channel 128 by passing through four cross-drilled holes 140 in the rod end cap 112. From the rod end channel 128, airflow is exhausted out the rod end port 132. This particular illustration details the transmission of airflow during control valve action that attempts to decrease the air pressure in the rod end working volume 106, and increase the pressure in the head end working volume 104.

Figure 3:
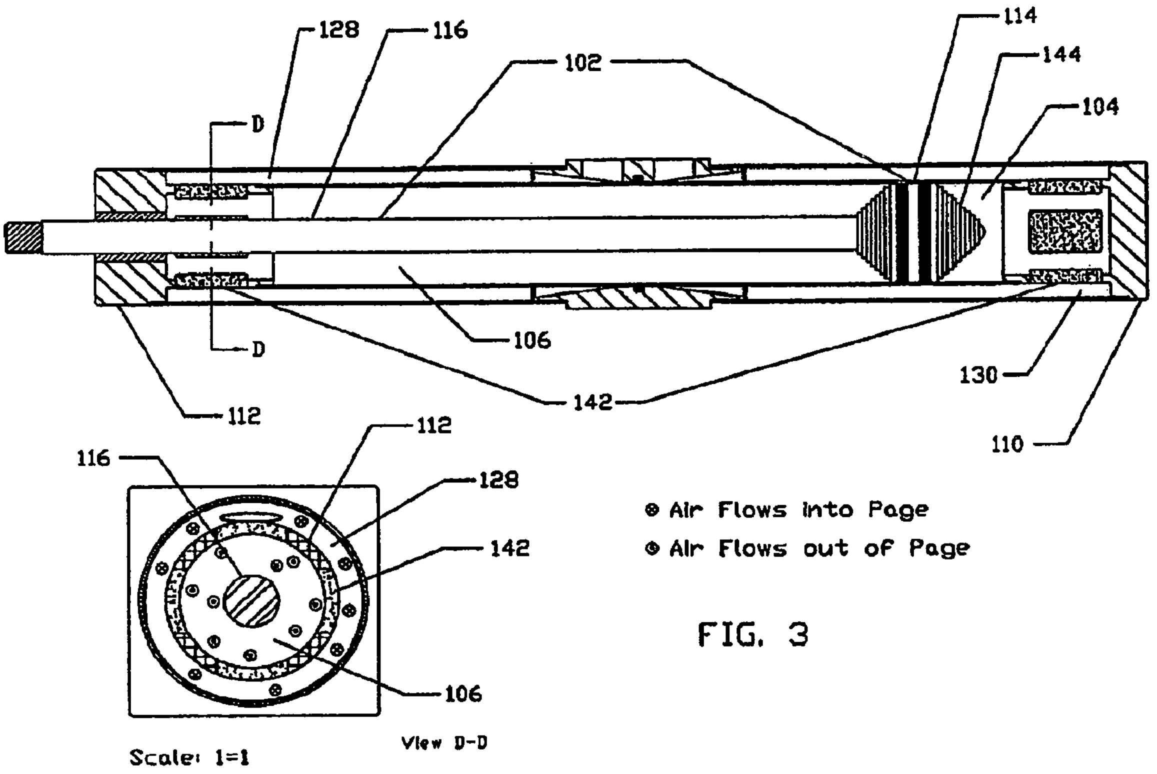
FIG. 3 illustrates the longitudinal cross section taken along lines A-A as shown in FIG. 1, but with silencing elements incorporated into the head and rod end caps, and with an alternate, un-cross sectioned, piston/rod assembly contained within the cylinder bore.
Figure 4:
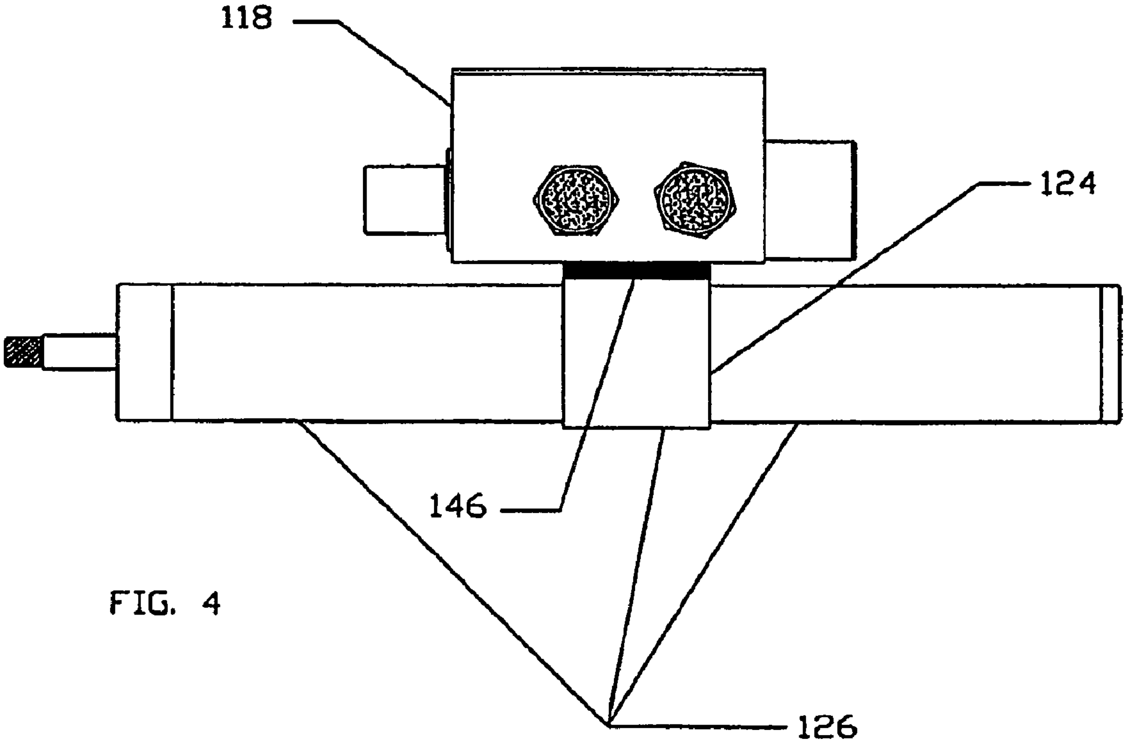
FIG. 4 illustrates the mounting of a control valve to the manifold coupler.
Figure 5:
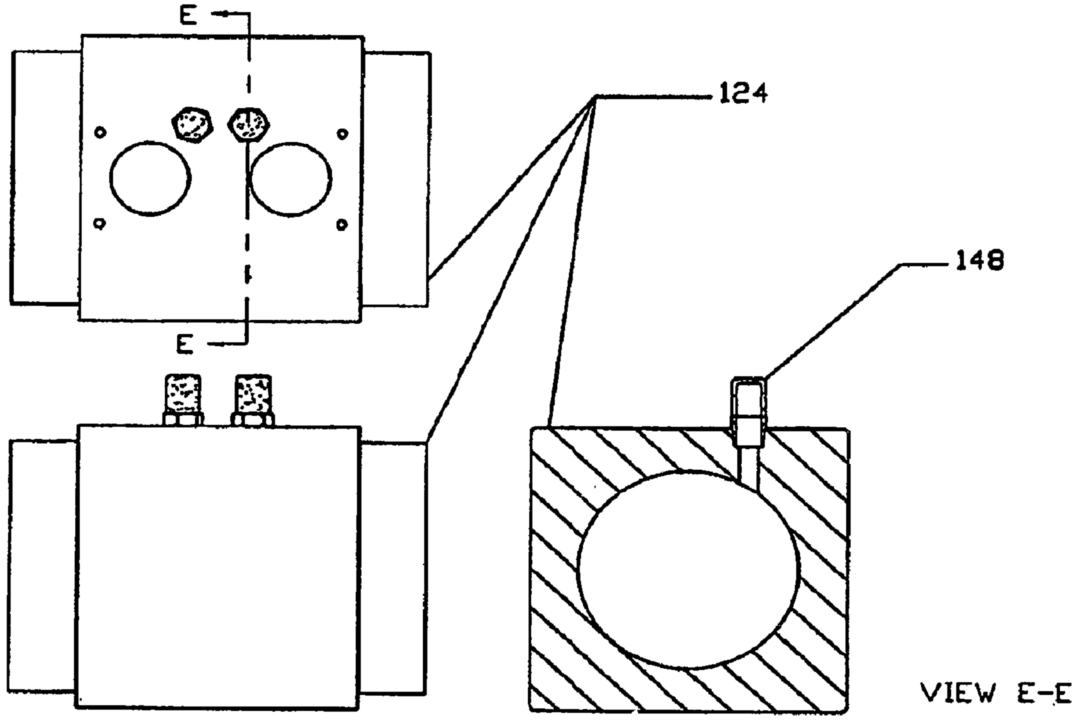
FIG. 5 illustrates the manifold coupler ported to provide the control valve with a silenced pressure signal from each working volume.
Figure 6:
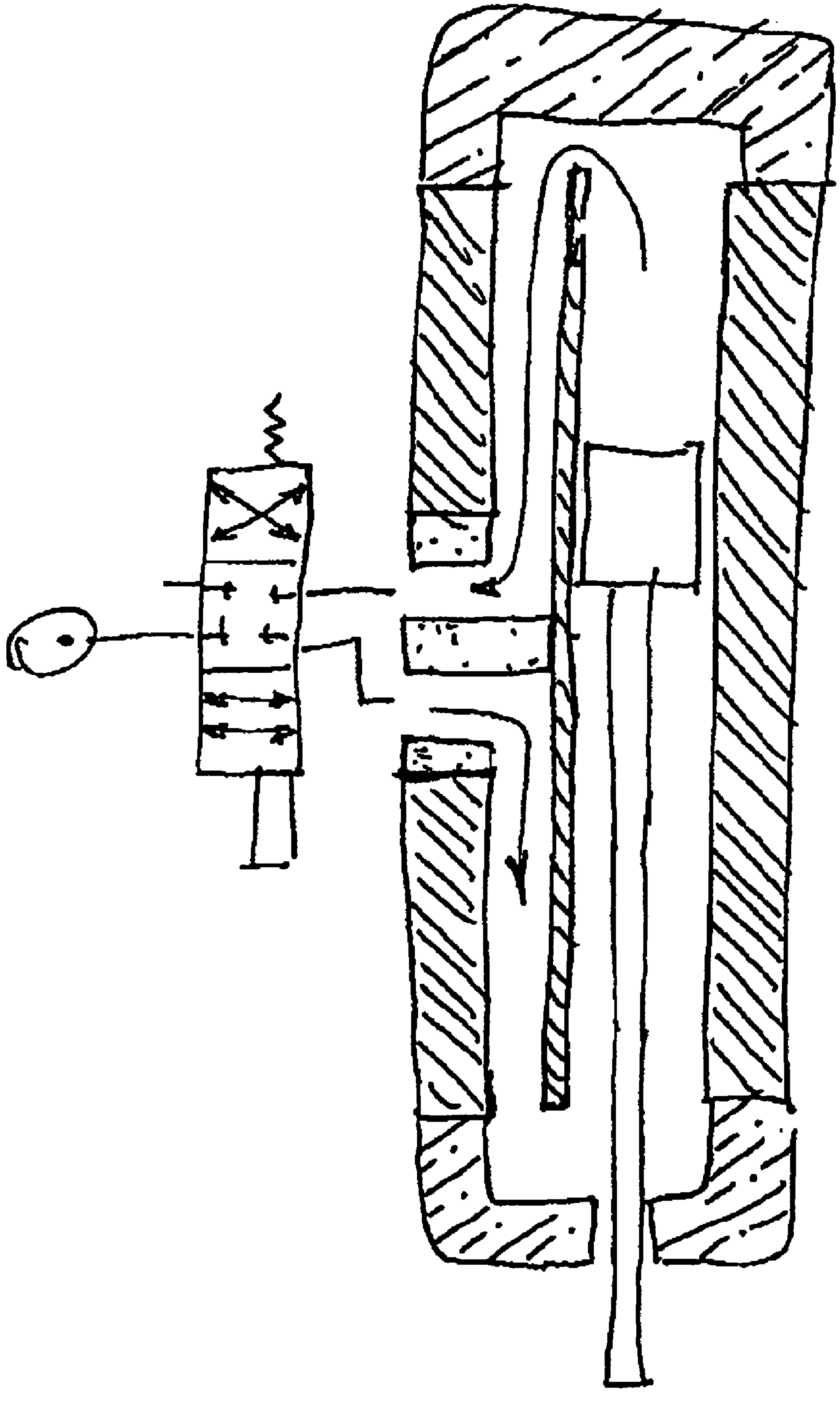
FIG. 6 illustrates another example pneumatic cylinder including internal flow channels and working volumes.

Silencers 142 may be included in the head end cap 110 and/or the rod end cap 112. The silencers 142 are preferably disposed in the direct path of airflow from the end channels 128 and 130 to their respective working volumes 106 and 104. Preferably, the silencers 142 function in lieu of the cross-drilled holes 140 as a path to communicate airflow between the channels 128 and 130 and the working volumes 106 and 104. The silencers 142 may be any suitable element that is placed in the path of a moving air column, which allows for the transmission of gas molecules, with minimal energy loss, while attenuating pressure or shock waves carried across the element. For example, a porous, sintered bronze element may be used as a silencer 142. A circumferential array of silencers 142, integral to the end caps 110 and 112, is illustrated in FIG. 3. This configuration attenuates the transmission of shock waves between each channel 128 and 130 and the corresponding working volumes 106 and 104. Referring to view D-D, the arrows show how air mass flows from the rod end working volume 106 into the rod end channel 128 by passing through four silencers 142 in the rod end cap 112.

An alternate embodiment of the piston/rod assembly 102 is illustrated in FIG. 3. In this embodiment, the piston 114 is preferably machined from cylindrical stock into a plurality of concentric discs 144. The diameter of each disc gets progressively smaller as the series extends from each side of the center of the piston 114. Preferably, each face of each disc 144 is perpendicular to the centerline of the rod 116. Hence, the working area, upon which differential pressure acts to create a force on the piston/rod assembly 102, is dispersed among a plurality of planes. This geometry creates a diffuser that restricts some shock waves from containment in a minimal frequency spectrum.

The manifold coupler 124 also acts as a structure to which the control valve 118 may be secured. When mounted directly to the manifold 126 (as opposed to a connection via soft or hard plumbing), the control valve 118 can communicate airflow with the channels 128 and 130, via the ports 132 and 134. In addition, the manifold coupler 124 can be ported to communicate the air pressure in each channel 128 and 130, through silencers 142 to cavities featured within the body of the control valve 118. The cavities are preferably sealed against the upper surface of the manifold coupler 124 when the control valve 118 is mounted to the manifold coupler 124. Pressure sensors, assimilated within each cavity, may be used to convert the silenced pressure signal into an electric signal suitable for acquisition by an analog to digital converter or like electronic measurement device.

In addition, an absorptive element 146 may be coupled between the control valve 118 and the manifold 126 to reduce mechanical vibrations transmitted between the control valve 118 and the manifold 126. For example, the absorptive element 146 may be constructed of polyurethane or other suitable material. Preferably, the absorptive element 146 allows unrestricted airflow communication between the control valve 118 and the manifold 126 while attenuating mechanical vibrations.

The above described arrangement results in a dynamic relationship, conducive to precision force and motion control, between desired airflow (which is proportional to the position of a moveable element within said air control device) and differential pressure.

Figure 8:
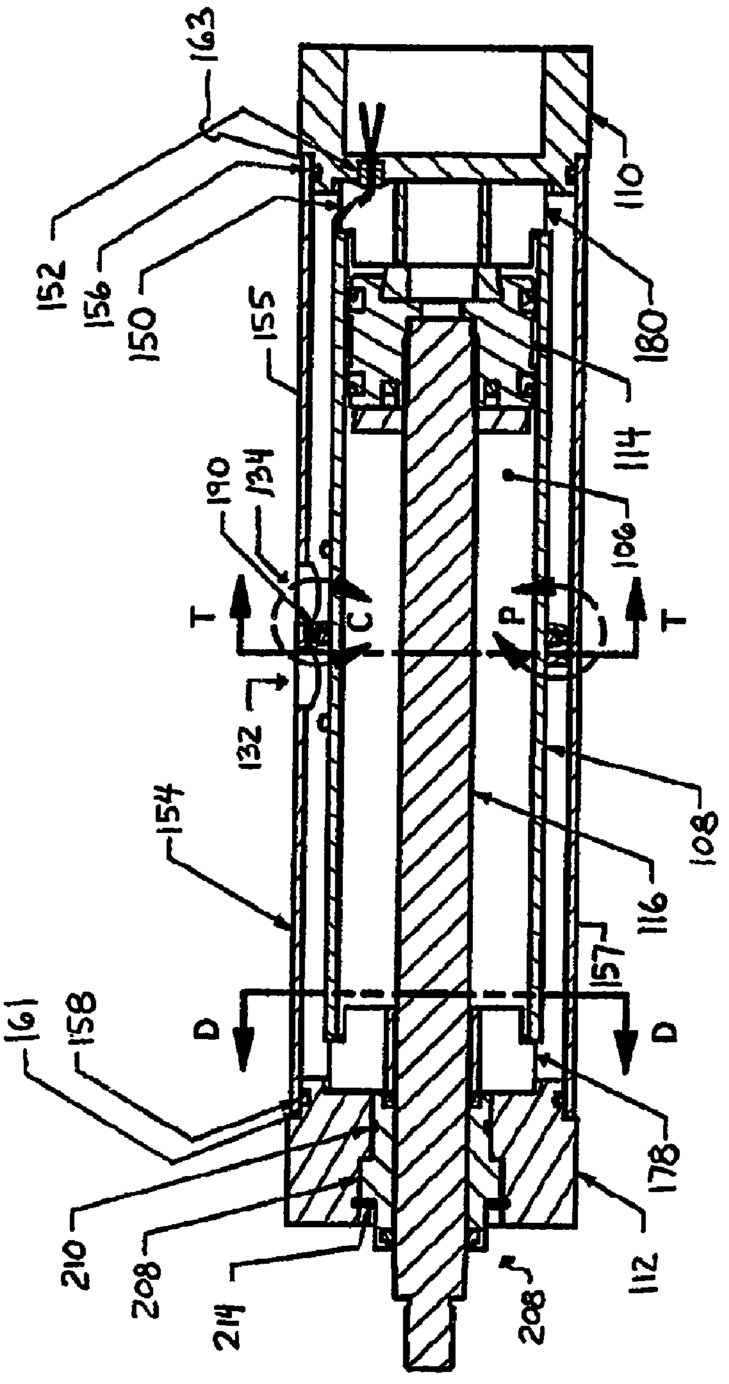
FIG. 8 illustrates the cross section taken substantially along lines C-C as shown in FIG. 7 with the manifold case, the cylinder sleeve and the manifold divider defining a first and second channel.
Figure 9:
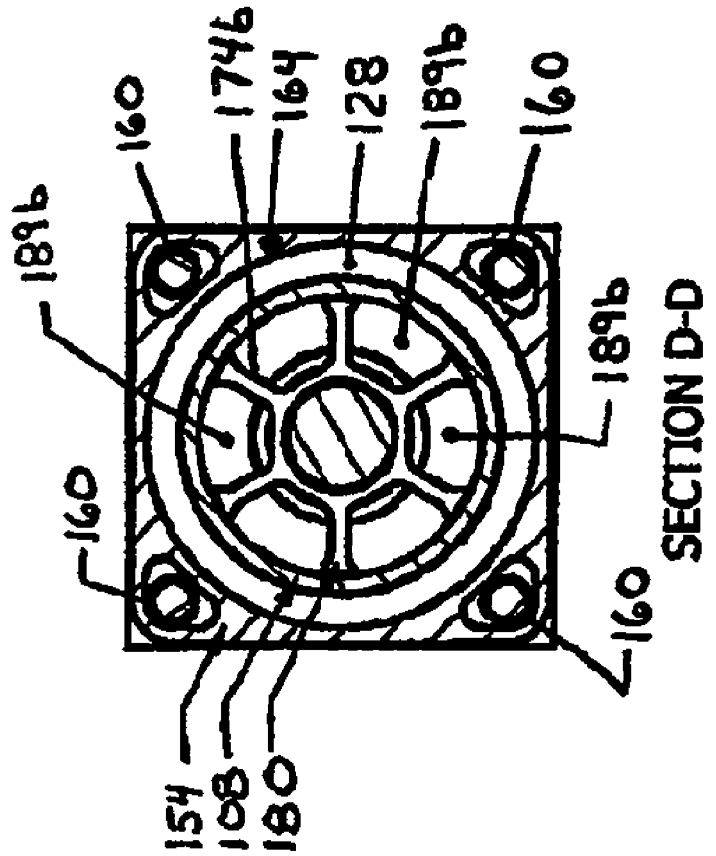
FIG. 9 illustrates the cross section taken substantially along lines D-D as shown in FIG. 8 with the end cap insert.
Figure 11:
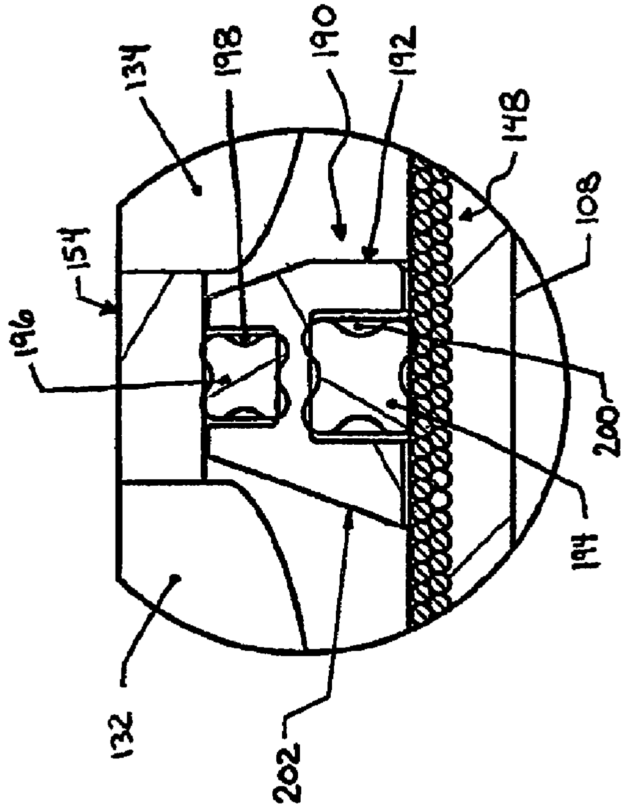
FIG. 11 is an enlarged view of one example of the pneumatic cylinder illustrating the manifold divider, the windings and the manifold divider flow relief.
Figure 12:
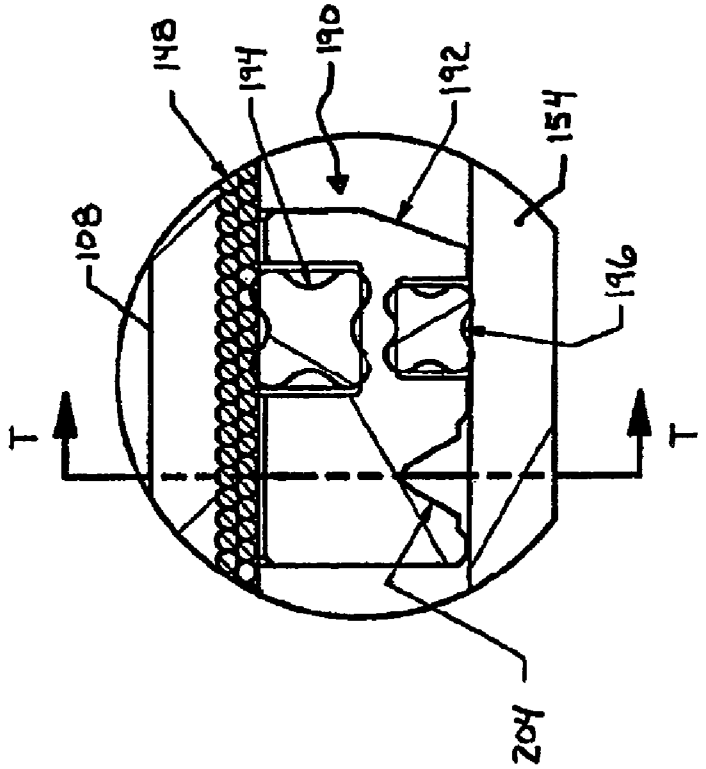
FIG. 12 is an enlarged view of one example of the pneumatic cylinder illustrating the manifold divider and the windings.

In one embodiment, the pneumatic cylinder includes a conductive coil winding coupled to the piston sleeve. In this embodiment the conductive coil is electrically excitable to provide sensing of the position of the piston. When the piston is composed of an electrically conductive material, such as aluminum, alternating currents in the coil will induce circulating currents in the conductive piston, which accordingly generates a magnetic field. The induced magnetic field impresses an electromagnetic signature on the conductive coil, and affects the electromotive force required to drive the alternating currents. If the conductive coil has a winding pattern that varies in a controlled manner along the length of the piston sleeve, there will be a deterministic relationship between this signature and the relative position of the piston with respect to the piston sleeve. In this way, position of the piston can be calculated. Referring to FIGS. 11 and 12, the conductive coil 148 is coupled to the piston sleeve 108. Referring to FIG. 8, the pneumatic cylinder includes conductive coil leads 150 and a conductive coil lead seal 152. In one embodiment, the conductive coil is a wire winding composed of copper. In another embodiment, the conductive coil is a wire winding composed of aluminum.

Figure 16:
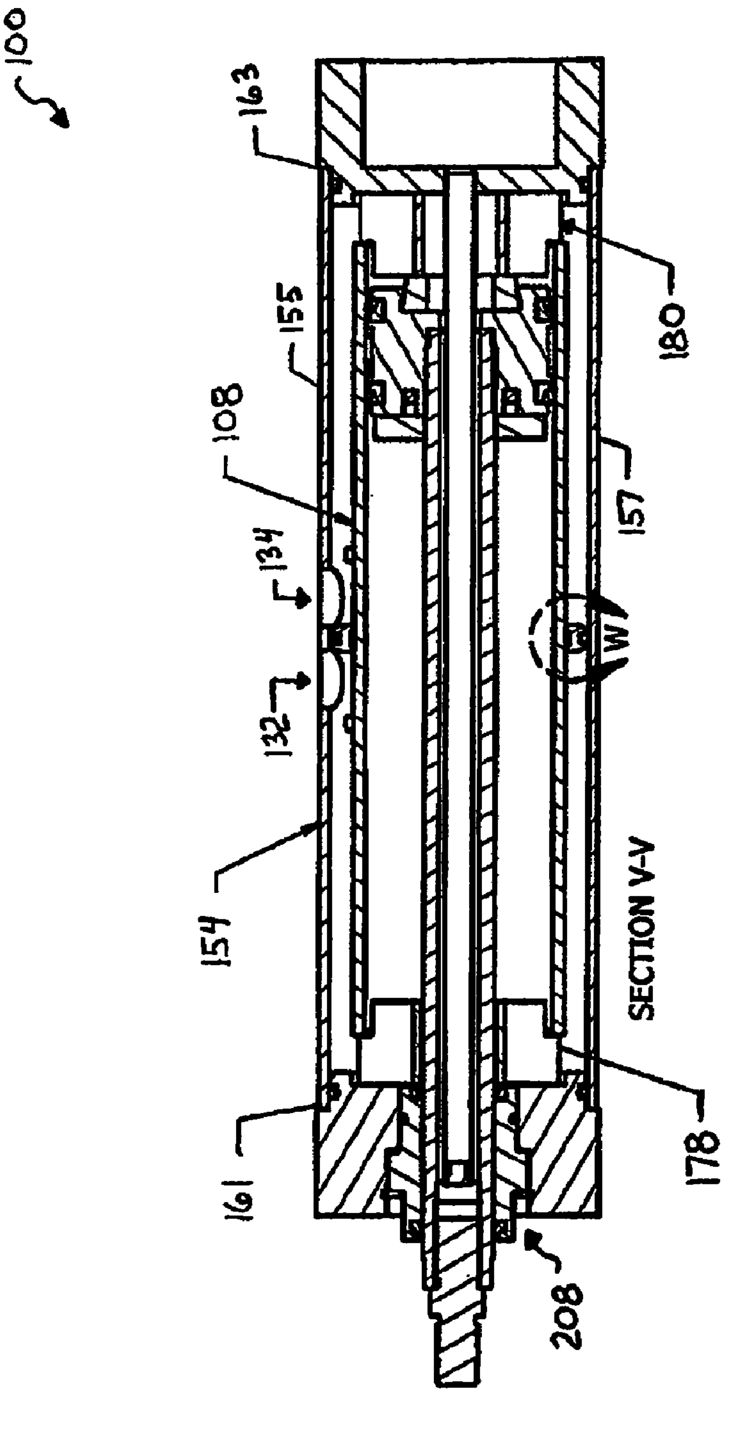
FIG. 16 illustrates the cross section taken substantially along lines V-V as shown in FIG. 15 with the manifold case, the cylinder sleeve and the manifold divider defining a first and second channel.
Figure 18:
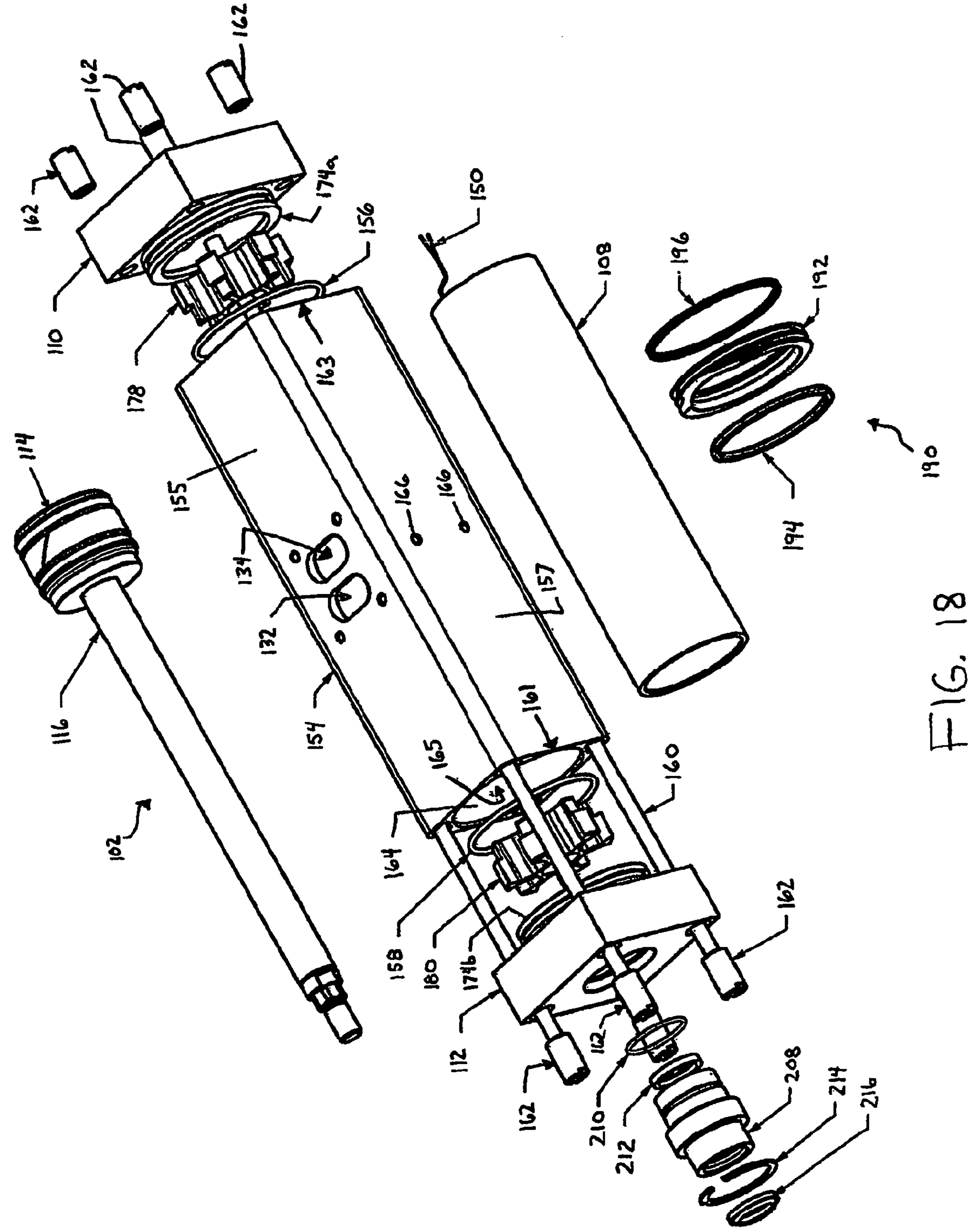
FIG. 18 is an exploded view of one example of the pneumatic cylinder illustrating piston/rod assembly, the manifold, the sleeve and the manifold divider.

In one alternative embodiment, the manifold includes a manifold case, a plurality of end caps and a connecting mechanism which connects the end caps to the manifold case. Referring to FIGS. 8, 16 and 18, in this example, the manifold 126 includes: (a) a manifold case 154; (b) a plurality of end caps including a head end cap 110 and a rod end cap 112; (c) a connecting mechanism including a plurality of tie rods 160 and tie rod nuts 162; and (d) a plurality of seals including a head end cap seal 156 and rod end cap seal 158.

Referring to FIGS. 8, 16 and 18, in one example embodiment, the manifold case 154 includes: (a) a top wall or frame 155; (b) a bottom wall or frame 157; and (c) side walls or frames 159. In this embodiment, each of the walls 154, 155 and 159 extend from the first end 161 of the manifold case to the second end 163 of the manifold case. The top wall 155 of the manifold case 154 defines a plurality of openings including a rod end valve port 132 and a head end valve port 134. The side walls 159 define a plurality of threaded holes 166, disposed in a manner to provide an anchor for a manifold divider. The manifold case 154 defines a manifold case bore 165 extending from the first end 161 of the manifold case 154 to the second end 162 of the manifold case 154 as best shown in FIG. 18. The manifold case bore 165 of the manifold case 154 has an inner dimension cylindrical surface 164. The manifold case 154 defines a plurality of tie rod bores 168.

Referring to FIGS. 7, 8, 13 to 16 and 18, in this example, the head end cap 110 and the rod end cap 112 each include: (a) an inner surface 170; (b) an outer surface 172; and (c) an end cap extension 174. In this example, the end cap extension 174 cylindrically extends from the inner surface 170 of the end cap. Each of the end cap extensions 174 have an inner dimension surface 175 and an outer dimension surface 177. In this example, the outer dimension surface 177 defines a seal groove 179 to partially nest an end cap seal.

Figure 7:
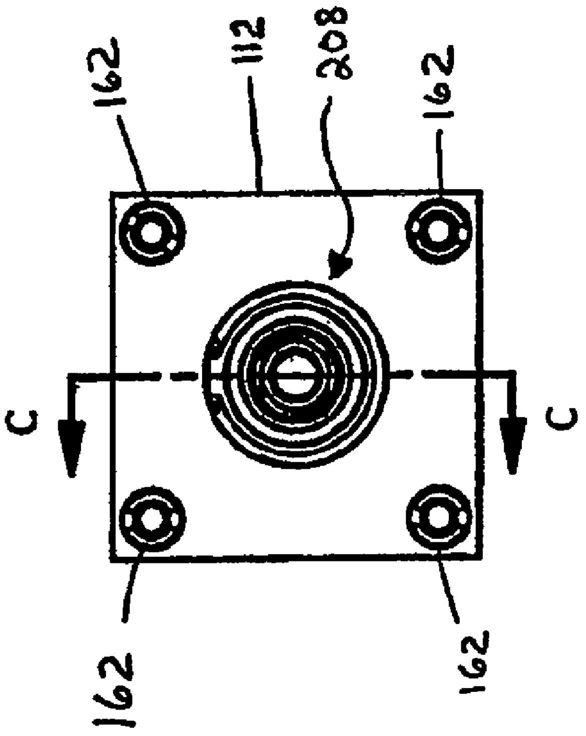
FIG. 7 illustrates a view of an example pneumatic cylinder including the rod end cap and the rod bushing assembly.
Figure 13:
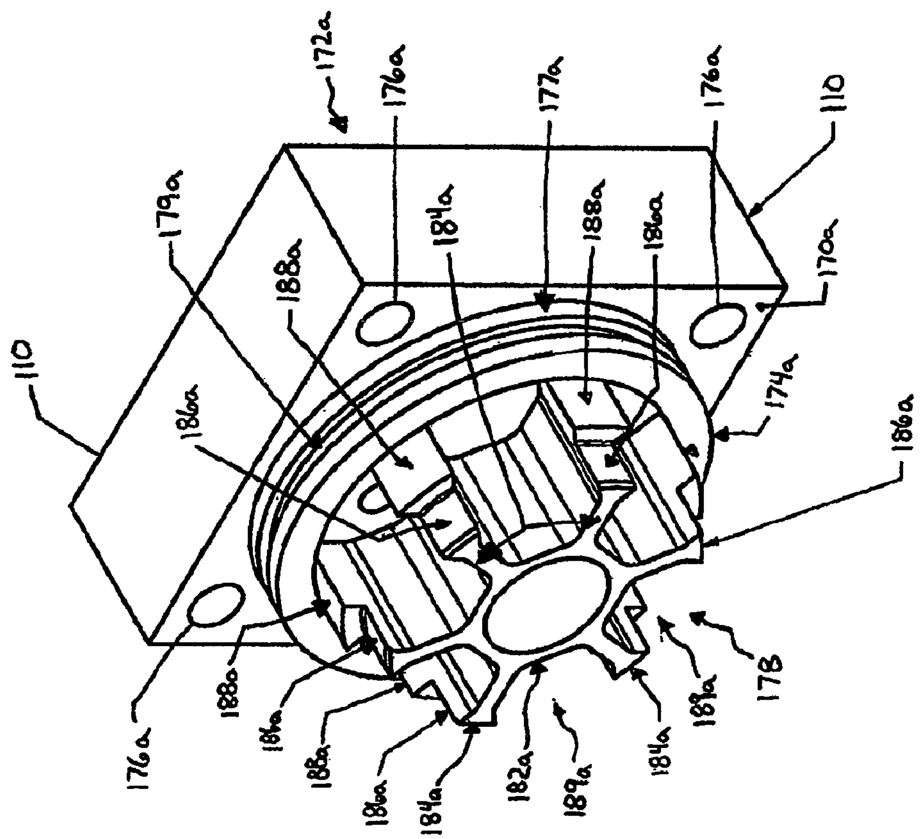
FIG. 13 illustrates one example of the head end cap connected to the head end cap insert.
Figure 14:
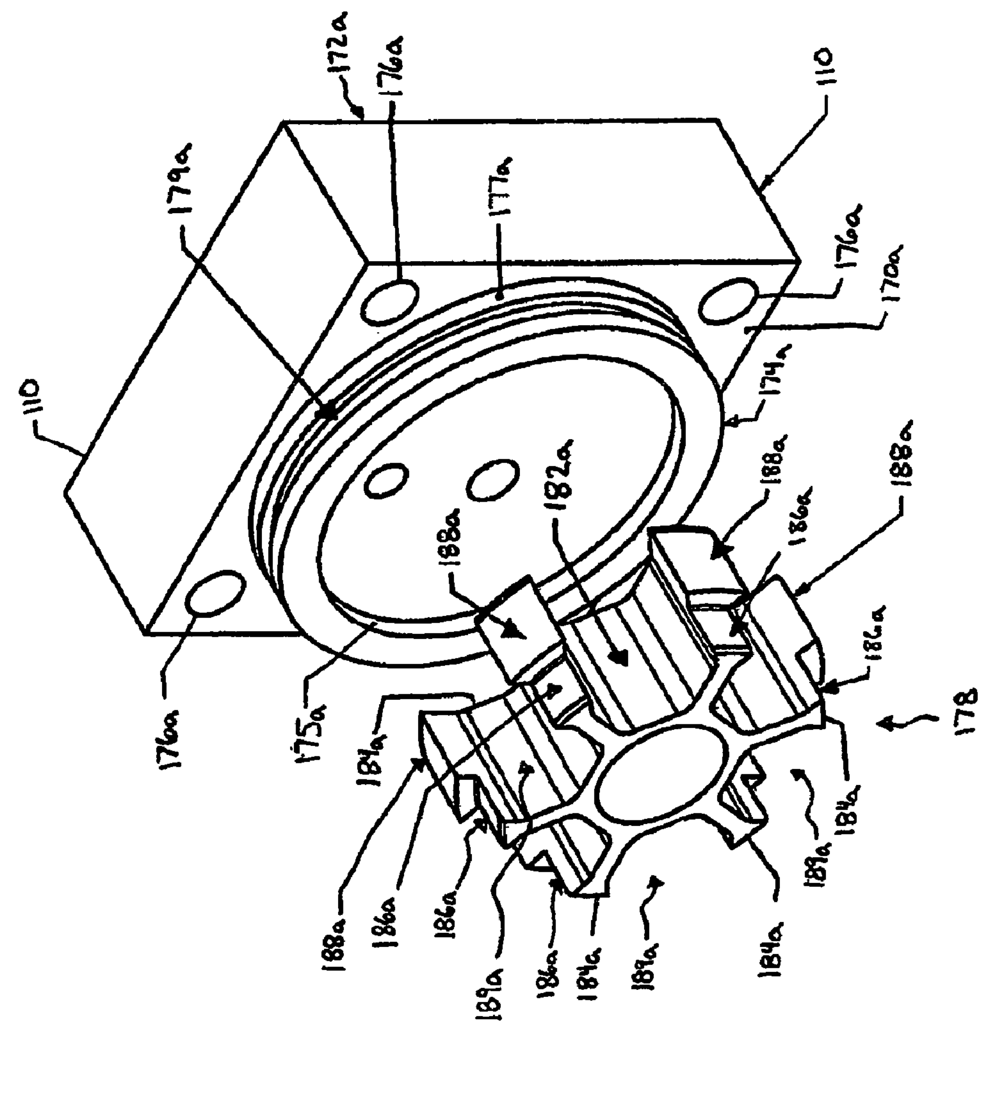
FIG. 14 is an exploded view of one example of the head end cap and the head end cap insert.
Figure 15:
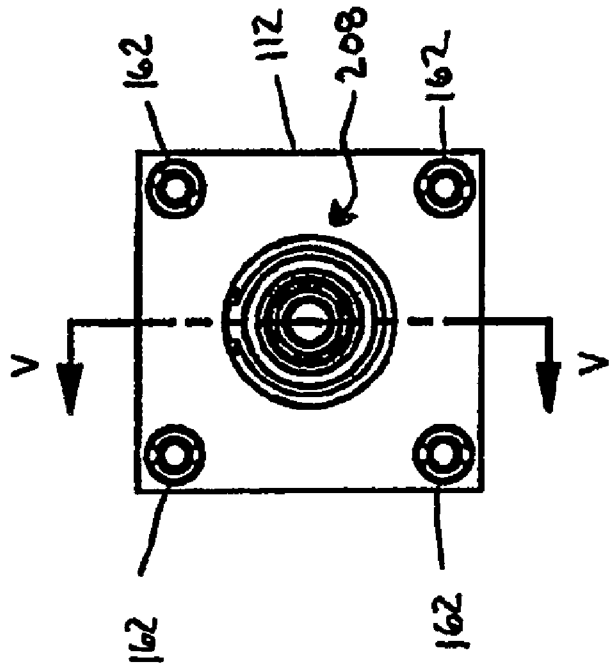
FIG. 15 illustrates a rod end view of another example pneumatic cylinder including the rod end cap and the rod end assembly.

In one embodiment, a plurality of tie rods and tie rod nuts secure the head end cap and the rod end cap to the manifold case. Referring to FIGS. 13 to 14 and 18, in this example, the head end cap 110 and the rod end cap 112 each define a plurality of end cap bores 176. A plurality of tie rods 160 are nested in the head end cap bores 176*a,* the tie rod bores 168 and the rod end cap bores 176*b*. A plurality of tie rod nuts 162 are screwed on the ends of the plurality of tie rods 182 as best shown in FIGS. 7, 15 and 18.

In one embodiment, the head end cap seal is nested between the head end cap and the manifold case. In this embodiment, the rod end cap seal is nested between the rod end cap and the manifold case. Referring to FIGS. 8 and 16, in this example, the head end cap seal 156 is nested between the seal groove 179*a* of the head end cap extension 174*a* and the inner dimension cylindrical surface 164 of the manifold case 154. The rod end cap seal 158 is nested between the seal groove 179*b* and the inner dimension cylindrical surface 164 of the manifold case 154. This example arrangement prevents air from moving from the working volumes to the atmosphere between the manifold case and the end caps.

In one embodiment, the pneumatic cylinder includes a plurality of end cap inserts. Referring to FIGS. 8, 9, 13 to 16 and 18, in this example, the pneumatic cylinder 100 includes a plurality of end cap inserts including a head end cap insert 178 and a rod end cap insert 180. Each end cap insert 178 and 180 includes a hub portion 182 and a plurality of insert extensions 184. In this example, the insert extensions 184 radially extend from the hub portion 182 as best shown in FIGS. 13 and 14. Each insert extension 184 includes a piston sleeve engaging member 186 and an end cap extension engaging member 188. In this example, the end cap extension engaging member 188 extends further from the hub portion 182 than the piston sleeve engaging member 186. A plurality of recesses 189 are defined between each insert extension 184 as best shown in FIGS. 13 and 14.

In one embodiment, a head end portion of the piston sleeve is engaged with the head end cap insert and a rod end portion of the piston sleeve is engaged with the rod end cap insert. Referring to FIGS. 8 and 16, the head end portion of the piston sleeve 168 engages the head end cap 110, and the rod end portion of the piston sleeve 168 engages the rod end cap 112. In this example, the inner dimension surface of the piston sleeve encircles the plurality of piston sleeve engaging members 186.

In one embodiment, the head end cap insert and the rod end cap insert are coupled to the head end cap and the rod end cap, respectively. Referring to FIGS. 8, 13, 14 and 16, in this example the head cap extension 174*a* encircles the plurality of head end cap engaging members 188*a* of the head end cap insert 178. The rod end cap extension 174*b* encircles the plurality of rod end cap engaging members 188*b* of the rod end cap insert 180.

This example arrangement with the end cap inserts enables air to flow between the end channels 128 and 130 and the working volumes 104 and 106 through the plurality of recesses 189 formed between the insert extensions 184.

In one embodiment, the pneumatic cylinder includes a manifold divider. In one embodiment, the manifold divider is disposed between the rod end port and the head end port. In one such embodiment the manifold divider includes a seal retainer and a plurality of seals. Referring to FIGS. 8, 10, 11, 12 and 16 to 18, in this example, the pneumatic cylinder 100 includes a manifold divider 190 which includes a seal retainer 192 and a plurality of seals including a cylinder sleeve seal 194 and a manifold case seal 196. In this example, the manifold divider 190 isolates the end channels from each other.

Figure 17:
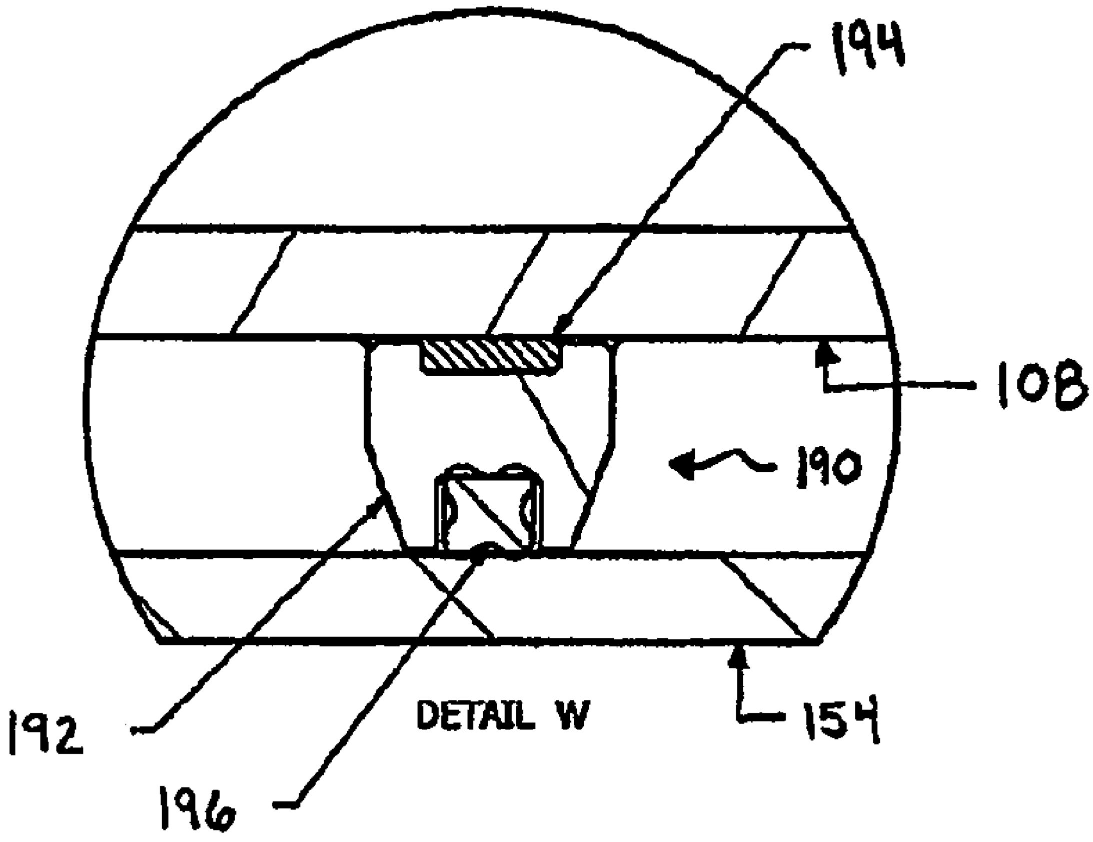
FIG. 17 is an enlarged view of one example of the pneumatic cylinder illustrating the manifold divider assembly with the cylinder sleeve seal retaining the manifold divider to the piston sleeve.

In one embodiment, the seal retainer defines an inner dimension seal groove and an outer dimension seal groove. Referring to FIGS. 11, 12 and 17, in this example, the seal retainer 192 defines the inner dimension seal groove 198 and the outer dimension seal groove 200. In this example, the inner dimension seal groove 198 retains the cylinder sleeve seal 194. The outer dimension seal groove 200 retains the manifold case seal 196.

Figure 10:
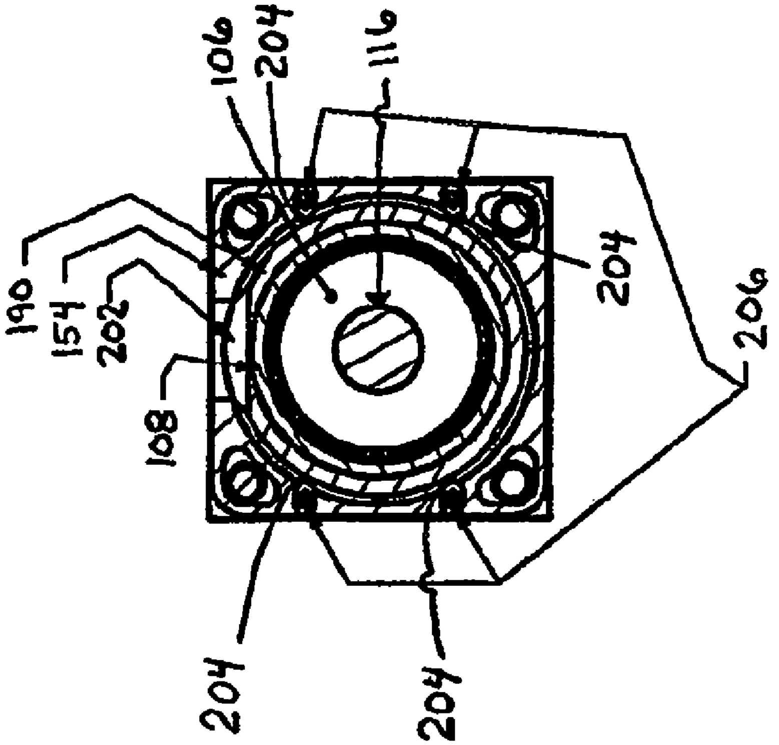
FIG. 10 illustrates the cross section taken substantially along lines T-T as shown in FIG. 8 with manifold divider and the manifold divider retaining screws.

In one embodiment, the manifold divider has an angled surface. Referring to FIGS. 10 and 11, the manifold divider 192 has an angled surface 202. This example arrangement provides air flow relief when air moves in and out of the head end port and rod end port.

In one embodiment, the manifold divider defines a plurality of retaining screw notches. Referring to FIGS. 10 and 12, in this example, the manifold divider 192 includes retaining screw notches 204. In FIG. 10 the plurality of set screws 206 retain the manifold divider 192 to the manifold case 154.

In one embodiment, the cylinder sleeve seal retains the manifold divider to the piston sleeve. Referring to FIG. 17, the cylinder sleeve seal 194 is shown retaining the manifold divider 192 to the piston sleeve.

In one embodiment, the cylinder sleeve seal and the manifold case seal are each O-rings.

In one embodiment, the pneumatic cylinder includes a rod bushing assembly. Referring to FIGS. 7, 8, 16 and 18, in this example, the rod bushing assembly 208 includes: (a) a rod bushing 210 nested in the rod end cap 112; (b) a rod bushing seal 212; (c) a rod seal 214; (d) a rod bushing retaining ring 216; (e) and a rod wiper 218. This example arrangement provides a guide for the rod when moving to and from the extended position and the retracted position.

While the specification and the corresponding drawings reference preferred examples, it should be appreciated that various changes may be made and equivalents maybe substituted for elements thereof without departing from the scope of the present invention as set forth in the following appended claims. In addition, many modifications may be made to adapt a particular situation or material to the teachings of the invention, as set forth in the appended claims, as defined in the appended claims, without departing from the essential scope thereof. Therefore, it is intended that the present invention not be limited to the particular examples illustrated by the drawings and described in the specification as the best modes presently contemplated for carrying out the present invention, but that the present invention will include any embodiments falling within the description of the appended claims and equivalents thereof.

The invention is claimed as follows:

1. A pneumatic cylinder comprising:

a manifold;

a sleeve nested within the manifold, the sleeve and the manifold defining a first channel between the sleeve and the manifold, the sleeve and the manifold defining a second channel, the second channel being different from the first channel;

a piston disposed in the sleeve to separate an interior volume defined by the sleeve into a first working volume and a second working volume, wherein the piston and the sleeve are arranged to enable a difference in air pressure between the first working volume and the second working volume to produce a differential pressure on the piston; and a conductive coil operatively coupled to the sleeve, the coil being electrically excitable to provide sensing of a position of the piston.

2. The pneumatic cylinder of claim 1, wherein the conductive coil is a wire winding composed of copper.

3. The pneumatic cylinder of claim 1, wherein the conductive coil is a wire winding composed of aluminum.

4. A pneumatic cylinder comprising:

a manifold case having a first end and a second end, the manifold case defining a first aperture associated with a first channel and a second aperture associated with a second channel, the second channel being different than the first channel;

a manifold divider nested within the manifold case, the manifold divider disposed between the first and second apertures;

a sleeve nested within the manifold case, wherein the sleeve, manifold divider, and manifold case define the first channel and the second channel;

a first end cap coupled to the first end of the manifold case, the first end cap isolating the first channel from atmosphere;

a second end cap coupled to the second end of the manifold case, the second end cap isolating the second channel from atmosphere;

a piston disposed in the sleeve to separate an interior volume defined by the sleeve into a first working volume and a second working volume, wherein the piston and the sleeve are arranged to enable a difference in air pressure between the first working volume and the second working volume to produce a differential pressure on the piston.

5. The pneumatic cylinder of claim 4, wherein the manifold divider includes at least two sealing surfaces, the two sealing surfaces configured to isolate air in the first channel from air in the second channel.

6. The pneumatic cylinder of claim 4, wherein the manifold divider includes a manifold seal retainer, the manifold seal retainer configured to at least partially retain a plurality of seals.

7. The pneumatic cylinder of claim 6, wherein the manifold divider seal includes a top portion having an angled surface.

8. The pneumatic cylinder of claim 4, wherein the manifold divider is secured to the sleeve.

9. The pneumatic cylinder of claim 4, wherein the manifold divider is secured to the manifold case.

10. The pneumatic cylinder of claim 4, which includes a first cap insert operatively coupling the first end cap to the sleeve, the first cap insert not having a continuous outside diameter.

11. The pneumatic cylinder of claim 10, wherein the first cap insert has a surface, wherein none of the surface is a sealing surface.

12. The pneumatic cylinder of claim 4, which includes a second cap insert operatively coupling the second end cap to the sleeve, the second cap insert not having a continuous outside diameter.

13. The pneumatic cylinder of claim 12, wherein the second cap insert has a surface, wherein none of the surface is a sealing surface.

14. The pneumatic cylinder of claim 4, wherein the manifold case defines threaded holes to secure the manifold divider to the manifold case.

15. The pneumatic cylinder of claim 4, wherein the sleeve is wound with a continuous conductive element, the continuous conductive element being electrically excitable to provide sensing of a position of the piston.

16. The pneumatic cylinder of claim 15, wherein the continuous conductive element is a wire composed of copper.

17. The pneumatic cylinder of claim 15, wherein the continuous conductive element is a wire composed of aluminum.

18. The pneumatic cylinder of claim 15, wherein the manifold case has a first end and a second end.

19. The pneumatic cylinder of claim 18, wherein the manifold case includes a plurality of walls wherein each wall extends from the first end to the second end.

* * * * *